United States Patent
Yang

(10) Patent No.: US 10,999,877 B1
(45) Date of Patent: May 4, 2021

(54) METHOD AND SYSTEM FOR IMPROVING CONTROL CHANNEL CONGESTION

(71) Applicant: MOTOROLA SOLUTIONS, INC., Chicago, IL (US)

(72) Inventor: Yunhai Yang, Elgin, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 29 days.

(21) Appl. No.: 16/715,483

(22) Filed: Dec. 16, 2019

(51) Int. Cl.
*H04W 74/08* (2009.01)
*H04W 28/02* (2009.01)
*H04W 72/12* (2009.01)
*H04W 48/02* (2009.01)
*H04W 8/18* (2009.01)

(52) U.S. Cl.
CPC ......... *H04W 74/085* (2013.01); *H04W 8/18* (2013.01); *H04W 28/0236* (2013.01); *H04W 28/0242* (2013.01); *H04W 48/02* (2013.01); *H04W 72/1252* (2013.01)

(58) Field of Classification Search
CPC ............. H04W 24/04; H04W 28/0236; H04W 28/0242; H04W 48/02; H04W 74/0833; H04W 74/085; H04W 8/18; H04W 72/1252
USPC ......................................................... 370/329
See application file for complete search history.

(56) References Cited

U.S. PATENT DOCUMENTS 7,840,220 B1 * 11/2010 Mitchell ............... H04L 1/0019
455/452.2
9,277,428 B2   3/2016 Chowdhary et al.

2002/0021686 A1 * 2/2002 Ozluturk ............... H04B 1/7075
370/342
2003/0153320 A1 * 8/2003 Noerpel ............ H04W 74/0833
455/450
2012/0083266 A1 * 4/2012 Vanswol ................. H04W 8/04
455/433
2012/0149384 A1 * 6/2012 Yin ....................... H04W 72/048
455/450
2012/0170743 A1 * 7/2012 Senese ................ H04W 12/047
380/259

(Continued)

OTHER PUBLICATIONS

A. Kumbhar, F. Koohifar, İ. Güvenç and B. Mueller, "A Survey on Legacy and Emerging Technologies for Public Safety Communications," in IEEE Communications Surveys & Tutorials, vol. 19, No. 1, pp. 97-124, Firstquarter 2017, doi: 10.1109/COMST.2016.2612223. (Year: 2017).*

(Continued)

*Primary Examiner* — Nathan S Taylor
(74) *Attorney, Agent, or Firm* — John B. MacIntyre

(57) ABSTRACT

A method and system for minimizing control channel contention in a communication system is provided. A subscriber unit relocator receives, via a broadband channel, a first access log indicating that the first subscriber unit had a first access failure on a narrowband channel from a first subscriber unit. The subscriber unit relocator targeted collects and receives, via the broadband channel, a second access log indicating that the second subscriber unit had a second access failure on the narrowband channel from a second subscriber unit. The subscriber unit relocator correlates the first access log, the second access log, and server data. The subscriber unit relocator adjusts parameters to minimize future inbound channel access problems.

14 Claims, 3 Drawing Sheets

(56) References Cited

U.S. PATENT DOCUMENTS

| | | | | |
|---|---|---|---|---|
| 2014/0064193 A1* | 3/2014 | Yacobi | ............... | H04W 72/1215 |
| | | | | 370/329 |
| 2015/0078329 A1* | 3/2015 | Zhu | ....................... | H04L 5/0005 |
| | | | | 370/330 |
| 2015/0319676 A1* | 11/2015 | Josan | .................... | H04W 48/16 |
| | | | | 455/434 |
| 2018/0009526 A1* | 1/2018 | Spengler | ............... | B64C 39/024 |
| 2018/0124770 A1* | 5/2018 | Yerramalli | ........ | H04W 72/0413 |
| 2018/0124776 A1* | 5/2018 | Yerramalli | ............ | H04L 5/0048 |
| 2018/0124777 A1* | 5/2018 | Yerramalli | .......... | H04W 72/048 |
| 2019/0166509 A1* | 5/2019 | Layne | ................... | H04W 24/08 |
| 2019/0259382 A1* | 8/2019 | Stogner | .................. | G10L 15/30 |
| 2020/0329348 A1* | 10/2020 | Halun | ..................... | H04W 4/90 |

OTHER PUBLICATIONS

H. Arslan and K. Molnar, "Iterative co-channel interference cancellation in narrowband mobile radio systems," 2000 IEEE Emerging Technologies Symposium on Broadband, Wireless Internet Access. Digest of Papers (Cat. No. 00EX414), Richardson, TX, USA, 2000, pp. 5 pp. -, doi: 10.1109/ETS.2000.916511. (Year: 2000).*

Chaudhry, Aizaz U, and Roshdy H. M Hafez. "LMR and LTE for Public Safety in 700MHz Spectrum." Wireless communications and mobile computing 2019 (2019): 1-17. Web. (Year: 2019).*

\* cited by examiner

METHOD AND SYSTEM FOR IMPROVING CONTROL CHANNEL CONGESTION

BACKGROUND OF THE INVENTION

In current Land Mobile Radio (LMR) systems, control channel congestion is an ongoing problem. Unfortunately, in current LMR systems there is little that can be done to fix control channel congestion.

An attempt has been made to use ATIA (Air Traffic Information Access) data to address this issue. However, ATIA data is not sufficient in solving the control channel contention issue because the ATIA typically only logs successful transactions. The ATIA does not include information regarding failed requests from subscriber units that are caused by collisions or RF conditions.

Another issue with current LMR systems is that subscriber units typically transfer the internally logged data regarding the failed attempts and retries at the end of a shift. A server collects this data from multiple subscriber units and sends the aggregated data to a central server. Unfortunately this prevents real-time analysis from occurring on the control channel congestion issue.

Therefore a need exists for a method and system for improving control congestion, and in particular improving control channel congestion in real-time.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
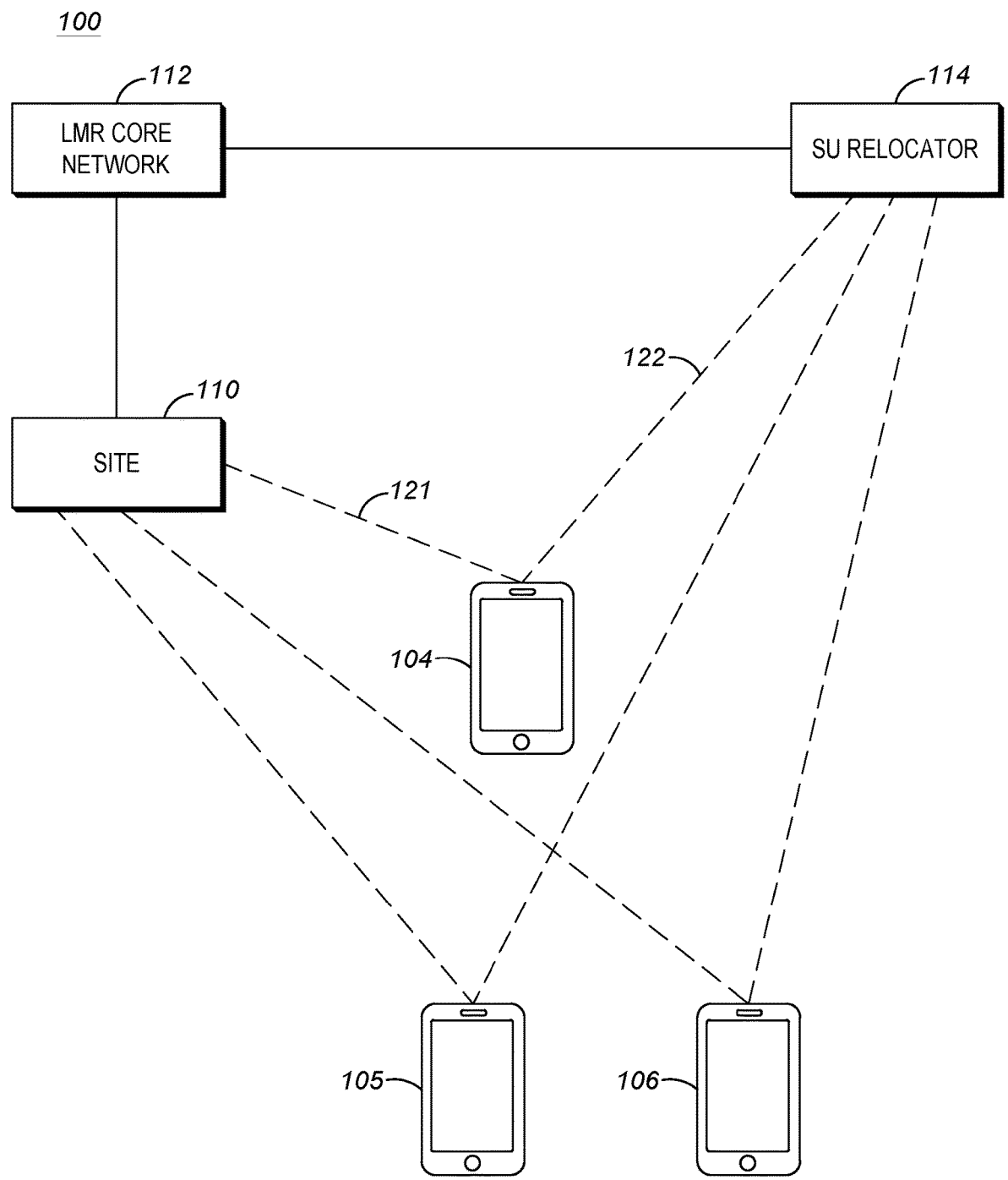
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with an exemplary embodiment, upon inbound access failure on a narrowband control channel the subscriber units send access logs through an alternate broadband channel to the infrastructure, preferably a Subscriber Unit Relocator. The Subscriber Unit Relocator gathers additional related subscriber unit access logs from subscriber units at the same site and also from neighboring sites. The Subscriber Unit Relocator correlates the collected data, preferably in real-time, with server data, such as ATIA data, and adjusts parameters to minimize future inbound control channel access problems.

An exemplary embodiment thereby provides a method to detect, mitigate, and prevent narrow band control channel congestion by correlating server data and edge device analytics through a broadband link in real time. A Subscriber Unit Relocator analyzes the server data to track the active subscriber units and the successful control channel traffic rate associated with any site. The Subscriber Unit Relocator uses edge subscriber units' analytics to trigger the infrastructure to collect targeted site's members specific blackbox info via the broadband link. The Subscriber Unit Relocator correlates server data and the blackbox information of the subscriber unit and triggers to collect the blackbox information of members of adjacent sites via the broadband link.

After correlation of the server data and the blackbox analytics of all subscriber units, the Subscriber Unit Relocator selects and relocates (or adjusts retry timer/allowance) a set of subscriber units to reduce the control channel contention of the targeted site, preferably without shifting the control channel contention problem to any adjacent site. The Subscriber Unit Relocator preferably continuously learns the desired distribution of devices among the sites and maintains the distribution as devices join the site, so as to prevent control channel contention from occurring in the future.

FIG. 1 depicts a system diagram of a communication system 100 in accordance with an exemplary embodiment of the present invention. Communication system 100 includes a Site 110, a Land Mobile Radio (LMR) Core 112, a Subscriber Unit (SU) Relocator 114, and communication devices 104, 105, and 106. The communication devices 104, 105, and 106 are sometimes referred to as subscriber units. In this exemplary embodiment, communication devices 104-106 are connected to Site 110 via narrowband link 121 and to SU Relocator 114 via Broadband link 122. Although only one site 110 is depicted in FIG. 1, it should be understood that a typical communication system 100 would include a plurality of sites, and that communication devices 104-106 could move about and connect to multiple of these plurality of sites as registered sites and adjacent sites.

Site 110 handles data traffic and includes a network of base stations (not shown), each of which functions as a base station for LMR Core 112. Site 110 uses the base stations to forward user data and signaling between LMR Core 112 and communication devices 104-106.

Land Mobile Radio (LMR) Core 112 includes multiple sites in addition to site 110, although only site 110 is show in FIG. 1 for clarity. LMR Core 112 also includes a Mobility Management Entity (MME) that is in charge of functions related to end-user authentication and a deployable home subscriber server for storing user-related and subscription-related information to LMR Core 112 to successfully complete network entry authentication of communication devices.

Subscriber Unit (SU) Relocator 114 is a network element that receives access logs that indicate access failure from communication devices 104-106. The access logs are preferably received by SU Relocator 114 over broadband link 122. SU Relocator 114 preferably gathers additional related subscriber unit access logs from subscriber units 104-106, which can include access logs from neighboring sites. SU Relocator 114 analyzes the server data to track the active subscriber units and the successful control channel traffic rate associated with any site. SU Relocator 114 correlates the server data and the blackbox analytics of all subscriber units to reduce the control channel contention of the targeted site, preferably without shifting the control channel contention problem to any adjacent site.

Communication devices 104, 105, and 106 are portable electronic communication devices that can be used for sending voice or data to other communication devices. Communication devices 104-106 are preferably capable of operating simultaneously over narrowband and broadband connections.

Figure 2:
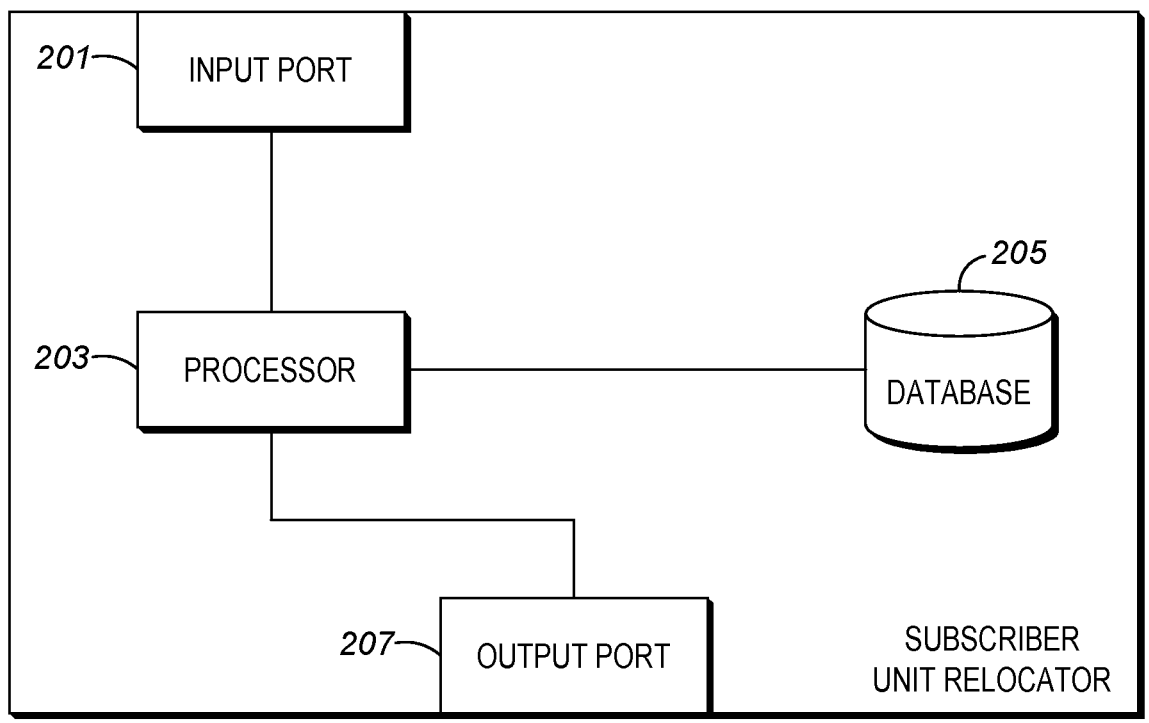
FIG. 2 depicts a schematic diagram of a subscriber unit relocator in accordance with an exemplary embodiment of the present invention.

FIG. 2 depicts a schematic diagram of Subscriber Unit Relocator 114 in accordance with an exemplary embodiment of the present invention. In the exemplary embodiment depicted in FIG. 2, Subscriber Unit Relocator 114 includes an input port 201, a processor 203, a database 205, and an output port 207. Input port 201 and processor 203 communicate over one or more communication lines or buses, as do processor 203 and output port 207. Wireless connections or a combination of wired and wireless connections are also possible.

Input port 201 receives electronic signals and messages from subscriber units 104-106 and LMR Core Network 112. Output port 307 transmits signals and messages to LMR Core Network 112 and subscriber units 104-106. Input port 201 and output port 207 are electrically connected to processor 203. Although depicted in FIG. 2 as two separate elements, input port 201 and output port 207 can be a single element.

Processor 303 may include a microprocessor, application-specific integrated circuit (ASIC), field-programmable gate array, or another suitable electronic device. Processor 303 obtains and provides information (for example, from database 305 and/or input port 301), and processes the information by executing one or more software instructions or modules, capable of being stored, for example, in a random access memory ("RAM") area of database 305 or a read only memory ("ROM") of database 305 or another non-transitory computer readable medium. The software can include firmware, one or more applications, program data, filters, rules, one or more program modules, and other executable instructions. Processor 303 is configured to retrieve from database 305 and execute, among other things, software related to the control processes and methods described herein.

Database 305 can include one or more non-transitory computer-readable media, and may include a program storage area and a data storage area. The program storage area and the data storage area can include combinations of different types of memory, as described herein. In the embodiment illustrated, database 305 stores, among other things, instructions for processor 303 to carry out the method of FIG. 3.

Figure 3:
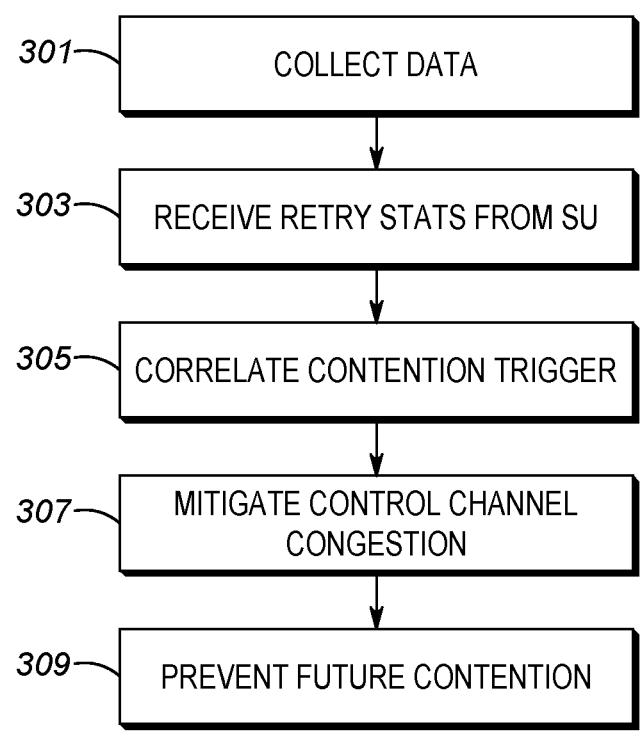
FIG. 3 depicts a call flow diagram in accordance with an exemplary embodiment of the present invention.

FIG. 3 depicts a call flow diagram 300 of a method for minimizing control channel contention in an LMR communication system in accordance with an exemplary embodiment of the present invention.

Subscriber Unit Relocator collects (301) data. In an exemplary embodiment, Subscriber Unit Relocator uses real time ATIA data to keep track of an active radios list per site. Subscriber Unit Relocator also preferably keeps track of an observed success control channel traffic rate. In accordance with an exemplary embodiment, Subscriber Unit Relocator collects ATIA data with the following opcodes: "Unit Registration", "Location Registration", "Group Affiliation", "Group Affiliation Query Response", "Site Trunking Registration/Affiliation Maintenance", "Group Deaffiliation", "Start of Call", "PTT-ID Busy Control", "PTT-ID Update Busy", "PTT-ID Update Active No Control", "PTT-ID Active No Control", "PTT-ID Update Active", "PTT-ID Update Busy No Control", "PTT-ID Active Control", "Call Information Change", "Radio Subscriber Reject", "Call Alert Ack", "Call Alert Event", "Proceeding ACK sent", "Private Call Ring Ack", "Emergency Indication", "Emergency Knockdown", "End Patch Reservation", "Cancel Call ACK", "Ring Update", "Start Patch Reservation", "Emergency Alarm", "Inhibit Ack", "Authentication Success", "Authentication Failure", "Authentication Timeout", "Deregistration", and "Individual Roamed Zones".

Subscriber Unit Relocator receives (303) retry statistics from the subscriber unit. In accordance with an exemplary embodiment, when the retry statistics of a subscriber unit exceed a predetermined threshold, the subscriber unit reports its blackbox analytic information to the Subscriber Unit Relocator via Broadband link 121.

Subscriber Unit Relocator receives reports from a plurality of subscriber units. When the number of reports from the same active radios list of a site over a certain duration exceeds a predetermined threshold, Subscriber Unit Relocator triggers the targeted site into a precautionary state. In accordance with an exemplary embodiment, the predetermined threshold can be exceeded when the number of samples exceeds a threshold, when the number of samples exceeds a count, or when the number of samples exceeds a predetermined percentage.

In accordance with an exemplary embodiment, Subscriber Unit Relocator queries blackbox analytic information from all the subscriber units on the targeted site's active radios list, preferably via the Broadband link 121. In accordance with a further exemplary embodiment, Subscriber Unit Relocator queries blackbox analytic information from a large portion of radios with recent CC activities on the targeted site's active radios list, preferably via the Broadband link 121. In a further exemplary embodiment, Subscriber Unit Relocator queries blackbox analytic information from all the subscriber units on the targeted site's active radios list, preferably via a generic query to all subscriber units via the control channel, and the subscriber units respond over Broadband link 121.

Subscriber Unit Relocator correlates (305) ATIA data and the blackbox information and estimates control channel loading for the targeted site as the information arrives. In accordance with an exemplary embodiment, when the estimated control channel loading exceeds a threshold, Subscriber Unit Relocator triggers the targeted site into a control channel contention state. The Subscriber Unit Relocator can determine that the estimated control channel loading exceeds a threshold based on air interface protocol, by comparing FDMA to the slotted control channel, by site type, or by comparing non-simulcast to simulcast with the number of subsites. Subscriber Unit Relocator preferably queries blackbox analytics information from all the subscriber units on the adjacent sites' active radios lists via the Broadband link 121.

Subscriber Unit Relocator mitigates (307) control channel Congestion. In accordance with an exemplary embodiment, Subscriber Unit Relocator distributes new sites ranking lists for a selected subset of subscriber units via Broadband link 121. Subscriber Unit Relocator preferably considers the reported sites signal quality, adjacent sites control channel capacity, sites channel resource capacity, subscriber unit locations, broadband availability, affiliated talkgroup members site location, and randomness. The sites channel resource capacity preferably includes +UEM (Unified Event Manager) channel health and +PM (Provisioning Manager) configured resources capability.

In accordance with an exemplary embodiment, Subscriber Unit Relocator adjusts the retry quantity and timer for a selected subset of subscriber units. For example, Subscriber Unit Relocator takes into consideration the reported sites signal quality, subscriber unit to talkgroup priority, roles, and the traffic type, such as voice or data.

In accordance with an exemplary embodiment, upon receiving the adjustment information from Subscriber Unit Relocator via Broadband link, the subscriber units move to a different control channel of an adjacent site. In a further exemplary embodiment, upon receiving the adjustment information from Subscriber Unit Relocator via Broadband link, the subscriber units adjust accordingly.

Subscriber Unit Relocator prevents (309) future contention, preferably using reinforcement learning. In accordance with an exemplary embodiment, Subscriber Unit Relocator continuously learns the desired distribution of subscriber units and parameter adjustments associated with time of day and events and signals the newly site registered subscriber units to the desired site. This can occur with or without parameter adjustment. Subscriber Unit Relocator preferably maintains the overall distribution of subscriber units among all the sites.

In accordance with an exemplary embodiment, Subscriber Unit Relocator proactively samples random blackbox analytic information from the subscriber units with the recent control channel activities based on ATIA and decides if a precautionary data query or contention type query is needed, which can be used to prevent control channel contention from occurring.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for minimizing control channel contention in a communication system, the method comprising:

receiving, at a subscriber unit relocator via a broadband channel, a first access log from a first subscriber unit, the first access log indicating that the first subscriber unit had a first access failure on a narrowband channel;

receiving, by the subscriber unit relocator via the broadband channel, a second access log from a second subscriber unit, the second access log indicating that the second subscriber unit had a second access failure on the narrowband channel;

correlating the first access log, the second access log, and server data; and adjusting, by the subscriber unit relocator, parameters to minimize future inbound channel access problems.

2. The method of claim 1, wherein the first subscriber unit is located at a first site, the step of receiving the second access log from the second subscriber unit comprises receiving a second access log from a second subscriber unit located at the first site.

3. The method of claim 1, wherein the first subscriber unit is located at a first site, the step of receiving a second access log from a second subscriber unit comprises receiving a second access log from a second subscriber unit located at a second site distinct from the first site.

4. The method of claim 1, the method further comprising the step of tracking the first subscriber unit and the second subscriber unit.

5. The method of claim 1, wherein the first subscriber unit is located at a first site, the method further comprising the step of collecting blackbox information from a plurality of sites that are adjacent to the first site.

6. The method of claim 1, wherein the first subscriber unit and the second subscriber unit are located at a first site, the method further comprising the step of relocating the second subscriber unit to a third site distinct from the first site.

7. The method of claim 1, wherein the first subscriber unit and the second subscriber unit are located at a first site, the method further comprising the step of adjusting a retry timer for the second subscriber unit.

8. A subscriber unit relocator for minimizing control channel contention in a communication system, the subscriber unit relocator comprising:

an input port for receiving via a broadband channel:
    a first access log from a first subscriber unit, the first access log indicating that the first subscriber unit had a first access failure on a narrowband channel;
    a second access log from a second subscriber unit, the second access log indicating that the second subscriber unit had a second access failure on the narrowband channel;

a processor for performing:
    correlating the first access log, the second access log, and server data; and
    adjusting, by the subscriber unit relocator, parameters to minimize future inbound channel access problems.

9. The subscriber unit relocator of claim 8, wherein the first subscriber unit is located at a first site, and wherein the input port receives the second access log from the second subscriber unit located at the first site.

10. The subscriber unit relocator of claim 8, wherein the first subscriber unit is located at a first site, and wherein the input port receives the second access log from the second subscriber unit located at a second site distinct from the first site.

11. The subscriber unit relocator of claim 8, the processor further performing tracking the first subscriber unit and the second subscriber unit.

12. The subscriber unit relocator of claim 8, wherein the first subscriber unit is located at a first site, the processor further performing collecting blackbox information from a plurality of sites that are adjacent to the first site.

13. The subscriber unit relocator of claim 8, wherein the first subscriber unit and the second subscriber unit are located at a first site, the processor further performing relocating the second subscriber unit to a third site distinct from the first site.

14. The subscriber unit relocator of claim 8, wherein the first subscriber unit and the second subscriber unit are located at a first site, the processor further performing adjusting a retry timer for the second subscriber unit.

* * * * *